Patented Feb. 8, 1927.

1,617,182

UNITED STATES PATENT OFFICE.

WALTER O. SNELLING, OF ALLENTOWN, PENNSYLVANIA, ASSIGNOR TO TROJAN POWDER COMPANY, OF NEW YORK, N. Y., A CORPORATION OF NEW YORK.

AMMONIUM-NITRATE EXPLOSIVE.

No Drawing.     Application filed June 10, 1922. Serial No. 567,417.

My invention relates to ammonium nitrate explosives, or explosives in which sensitized ammonium nitrate is an ingredient, one object being to secure a more intimate incorporation of the sensitizing agent with the ammonium nitrate than has hitherto been possible.

Ammonium nitrate is widely used as a constituent of explosives, but it is itself difficultly explosive, and only becomes sufficiently sensitive for use as an explosive in association with sensitizing materials such as trinitrotoluene, nitroglycerin, etc.

Hitherto it has been recognized that in the making of ammonium nitrate-trinitrotoluene explosives thorough mixing and incorporation are desirable, and such mixing has been brought about in mixing machines by long and complete incorporation. But by this and other methods heretofore employed, no such intimate contact between the ammonium nitrate and the sensitizing agent has been brought about as is necessary to secure the degree of sensitization desired without the employment of excessive amounts of the sensitizing ingredients, and the characteristic of low sensitiveness has been a principal factor in retarding the development of explosives of high ammonium nitrate content.

I have discovered a new method of preparing ammonium nitrate of high sensitiveness, my improved product consisting of crystals of ammonium nitrate containing disseminated through such crystals particles of a sensitizing agent in finely divided form. In this way I have obtained far more intimate contact than has ever heretofore been possible.

As an illustration of my invention, I will describe the preferred method which I employ in preparing sensitized ammonium nitrate containing 5% of trinitrotoluene as the sensitizing agent. I first dissolve my trinitrotoluene in a small amount of warm alcohol, preferably using either methyl alcohol or denatured alcohol and a temperature of about 60° C. As the solubility of trinitrotoluene in either methyl alcohol or denatured alcohol is very high, especially when the latter is warm, I find it necessary to use only a very small amount of alcohol to obtain complete solution. I next dissolve ammonium nitrate in hot water, preferably at about 60° C., in this case also preparing a substantially saturated solution. Having thus prepared substantially saturated solutions of ammonium nitrate in water, and of trinitrotoluene in alcohol, I mix the two solutions together, preferably with cooling. Since ammonium nitrate is soluble in water but not in alcohol, and trinitrotoluene is soluble in alcohol and not in water, the mixing together of the two solutions causes a mutual precipitation of both the ammonium nitrate and the trinitrotoluene. I preferably use the solutions in such proportions that in the mixture there are approximately 5 parts of trinitrotoluene to each 95 parts of ammonium nitrate, and under these conditions my ammonium nitrate separates as crystals containing finely divided and finely disseminated particles of trinitrotoluene.

The process described is capable of variation. For example, instead of using pure water as a solvent for ammonium nitrate and pure alcohol as a solvent for trinitrotoluene, I may use a mixture of alcohol and water as a solvent for both ammonium nitrate and trinitrotoluene. It is true that trinitrotoluene is less soluble in a mixture of water and alcohol than it is in alcohol alone, and similarly ammonium nitrate is less soluble in a mixture of alcohol and water than it is in water alone, but I find that there is sufficient solubility in each case to enable me to obtain a solution containing both ammonium nitrate and trinitrotoluene in a hot mixture of alcohol and water, the presence of the ammonium nitrate assisting in rendering the trinitrotoluene soluble. By cooling such a solution I obtain the simultaneous precipitation of both my ammonium nitrate and my trinitrotoluene, and the resulting crystals contain the two materials in extremely intimate contact.

As an example of the latter process, I may take a mixture of 75% methyl alcohol and 25% water, and at a temperature of 60° centigrade bring said mixture into contact with an excess of both ammonium nitrate and trinitrotoluene. When the point of saturation has been reached, I evaporate this solution, and under these conditions obtain crystals of ammonium nitrate containing about 6% of trinitrotoluene. Other desired percentages of trinitrotoluene in the ammonium nitrate crystals may be obtained by varying the percentage of alcohol in the mixture, a mixture of 60% methyl alcohol and 40% water for example and under the above conditions giving crystals of nitrate containing approximately 2% of trinitrotoluene. Higher percentages of alcohol in the mixture will give correspondingly higher percentages of trinitrotoluene in the nitrate crystals. Temperatures other than 60° centigrade may be employed if so desired, but variation in this temperature will alter the relative proportions of ammonium nitrate and trinitrotoluene in the finished product. Instead of evaporating my solution to obtain crystals, I may saturate my solution with both ammonium nitrate and trinitrotoluene, and then cool. As the tendency of the trinitrotoluene to remain in solution is greater under these conditions than the tendency of the ammonium nitrate to remain in solution, I find it desirable to work with solutions which dissolve a larger percentage of trinitrotoluene than I desire to have in my final crystals. For example, I find that a mixture of 70% of methyl alcohol and 30% of water saturated at 60° centigrade with both trinitrotoluene and ammonium nitrate will give, on being cooled to 10° centigrade, crystals of ammonium nitrate containing trinitrotoluene in disseminated condition in suitable amount to form a very desirable component of explosive mixtures.

It is possible to obtain crystals of ammonium nitrate with the desired dissemination therein of trinitrotoluene particles without employing alcohol or similar solvent for the trinitrotoluene. Although trinitrotoluene is practically insoluble in water, I find that it is somewhat soluble in solutions of ammonium nitrate and particularly when the solutions of ammonium nitrate are concentrated and hot. In this variation of my process, I dissolve ammonium nitrate in the smallest possible amount of water at about the boiling temperature, and to this concentrated solution of ammonium nitrate in water I add trinitrotoluene, the amount of the latter depending upon the percentage required in the final crystals. I find for example that by adding about 1 part of trinitrotoluene to each 200 parts of ammonium nitrate in my hot solution, I obtain crystals of ammonium nitrate which contain about one-half of 1% of trinitrotoluene. The trinitrotoluene dissolves to a limited extent in the concentrated solution of ammonium nitrate, forming a brown solution. As the trinitrotoluene is maintained in solution only because of the solvent action of the ammonium nitrate which is also in solution, it will be evident that if any of the ammonium nitrate is precipitated or crystallized out from the solution, this will lead to a lessened solubility of the remaining solution for the dissolved trinitrotoluene, and accordingly some of the trinitrotoluene will have to separate from solution. By cooling the solution I am able to cause the crystallization of part of the ammonium nitrate, and the lessened solubility so produced causes the simultaneous crystallization of part of the trinitrotoluene, the trinitrotoluene being disseminated through the crystals of ammonium nitrate in finely divided form.

It will be evident that my invention is not limited to the use of trinitrotoluene as a sensitizing agent for ammonium nitrate, since there are many other sensitizing agents which may be employed in a similar way. In addition to other organic nitrated bodies, such as mononitronaphthalene, dinitronaphthalene and similar nitro bodies, I may even employ unnitrated sensitizing agents, such as rosin and other combustible organic bodies. As an example of the unnitrated sensitizing agent, I will describe the process which I employ in making ammonium nitrate sensitized with ordinary rosin. I first dissolve my rosin in alcohol, preferably making a saturated solution at about 60° C., and I then dissolve my ammonium nitrate in water, again preferably making a saturated solution and at the same temperature. Since rosin is soluble in alcohol but not in water, while ammonium nitrate is soluble in water but is less soluble in dilute alcohol, the mixing together of the two solutions results in the simultaneous precipitation of both the ammonium nitrate and the rosin. I preferably employ the solutions in proportions giving from 2 parts to 5 parts of rosin to each 95 or 98 parts of ammonium nitrate, and under these conditions I obtain my rosin in the form of fine particles disseminated through the crystals of my ammonium nitrate. By cooling the mixture to a temperature of about 5° centigrade, I get crystals of ammonium nitrate which contain about 3% of rosin, but by employing a larger proportion of the rosin solution, I may obtain crystals of ammonium nitrate containing 10% or even 20% of the rosin.

I may dispense with the use of alcohol as a solvent for the rosin by reacting upon the latter with an alkali to form an alkali resinate and mixing this with a concentrated solution of ammonium nitrate. Upon now adding nitric acid to the mixture as formed above the alkali unites with the nitric acid to form an alkali nitrate, while the rosin is precipitated. By using a saturated solution of ammonium nitrate, and employing ammonia as my alkali, the solution becomes super-saturated toward ammonium nitrate when nitric acid is added, and as a result I obtain the simultaneous precipitation or crystallization of ammonium nitrate and rosin, the rosin being present in the crystals of ammonium nitrate as finely disseminated particles. In forming the resinate, the alkali and rosin may be heated together in approximately molecular proportions, but I prefer to use a slight excess of alkali and to react on my rosin with my alkali at a temperature of about 100° centigrade, the alkali being in solution in water.

As will be seen from the illustrations given, my invention involves the preparation of sensitized ammonium nitrate by crystallizing ammonium nitrate from a concentrated solution and simultaneously crystallizing from solution a body which is capable of sensitizing ammonium nitrate, in such a way that the sensitizing agent becomes disseminated in fine particles in and through the crystals of ammonium nitrate as they form. In this way I am able to obtain far more intimate and complete admixture of my ammonium nitrate and sensitizing agent than has heretofore been found possible, with a much greater degree of sensitization for the proportion of sensitizing agent employed. This causes my new product to be far more satisfactory for use in the manufacture of explosives than such mixtures of ammonium nitrate and trinitrotoluene as have hitherto been prepared.

In another form of my invention, I emulsify trinitrotoluene in a solution of ammonium nitrate, preferably employing a quite concentrated solution of ammonium nitrate. I may, for example, use a saturated solution of ammonium nitrate in water at a temperature of 90° centigrade, adding to this solution a considerable excess of trinitrotoluene over the amount which the ammonium nitrate solution will dissolve. For example, I may use 1 part of trinitrotoluene to 4 parts of saturated ammonium nitrate solution, this being a much larger proportion of trinitrotoluene than will dissolve in the ammonium nitrate solution. By churning the two materials together, I obtain an emulsion of trinitrotoluene in the hot ammonium nitrate solution. I now add this emulsion to approximately five times its weight of saturated nitrate solution at 90° centigrade, and I cool the material by continued stirring to a temperature, for example, of 5° centigrade. In this way I obtain crystals of ammonium nitrate which contain small globules of trinitrotoluene disseminated through them. The size of the crystals of ammonium nitrate is determined by the rapidity of cooling, and I preferably cool at a fairly rapid rate so as to obtain crystals of ammonium nitrate which average from one-half millimeter to one millimeter in diameter. By the above described method, I obtain crystals of ammonium nitrate containing from 5% to 6% of trinitrotoluene.

I may use my sensitized ammonium nitrate made as described in this application either alone as an explosive, or as an admixture in other explosive mixtures. Where I use my sensitized ammonium nitrate alone as an explosive I prefer to have from two to five percent of trinitrotoluene or other sensitizing agent present as disseminated particles in and through my crystals of ammonium nitrate, but I may use either a smaller or a larger quantity of sensitizing agent than stated, according to the nature of the sensitizing agent and the purpose for which the finished explosive is to be used. When I employ my sensitized ammonium nitrate as a constituent of other explosives I may use any desired percentage of disseminated sensitizing agent, and I find that even as small a quantity as a few tenths of one percent of a disseminated detonating agent through crystals of ammonium nitrate gives a product which is much more satisfactory for use in explosives than ordinary ammonium nitrate. As illustrations of the use of my improved ammonium nitrate in explosive compositions, I cite the following examples:

Example A.

Per cent.

Nitrostarch _____ 7
Ammonium nitrate containing 5% of trinitrotoluene disseminated in fine particles through the crystals _____ 93

Example B.

Nitrostarch _____ 15
Ammonium nitrate containing .3% of trinitrotoluene disseminated in fine particles through the crystals _____ 80
Sodium nitrate _____ 4.5
Petrolatum _____ .2
Zinc oxide _____ .3

Many other similar examples could be given. Although I have mentioned nitrostarch in the above examples, I do not wish to be confined to the use of that particular material as a secondary detonating agent since nitroglycerin or any other secondary detonating agent could be used with equal success.

I claim:

1. As a new composition of matter, crystals of ammonium nitrate containing disseminated particles of a sensitizing agent.

2. As a new composition of matter, crystals of ammonium nitrate containing disseminated particles of an organic sensitizing agent.

3. As a new composition of matter, crystals of ammonium nitrate containing disseminated particles of a nitrated organic body.

4. As a new composition of matter, crystals of ammonium nitrate containing disseminated particles of a resin.

5. As a new composition of matter, crystals of ammonium nitrate containing disseminated particles of a combustible organic body.

6. As a new composition of matter, crystals of ammonium nitrate containing disseminated particles of a combustible body.

7. As a new composition of matter, crystals of ammonium nitrate containing disseminated particles of a sensitizing agent, the latter being from two to five per cent of the composition.

8. An explosive comprising ammonium nitrate in the form of crystals containing disseminated particles of a sensitizing agent.

9. In the manufacture of explosives, the process which comprises simultaneously crystallizing ammonium nitrate and a sensitizing agent in relative quantities affording a preponderance of the ammonium nitrate over the sensitizing agent in the resulting cocrystallized mixture.

10. In the manufacture of explosives, the process which comprises forming a solution of ammonium nitrate, dissolving a nitrated organic body in such solution, and bringing about the simultaneous separation from solution of parts of the ammonium nitrate and part of the nitrated organic body.

11. The process of disseminating a sensitizing agent through ammonium nitrate, which comprises dissolving ammonium nitrate in a fluid in which it is soluble, dissolving the sensitizing agent in the solution of ammonium nitrate so formed, and simultaneously separating from solution the two dissolved materials.

12. The method of disseminating particles of a sensitizing agent through crystals of ammonium nitrate, which comprises dissolving said nitrate in a liquid solvent incapable of dissolving the sensitizing agent, dissolving said sensitizing agent in a liquid solvent incapable of dissolving the said nitrate, and mixing said solutions together, thereby to obtain simultaneous separation from the solution of both the nitrate and the agent.

13. The method of effecting a dissemination of particles of a sensitizing agent through crystals of ammonium nitrate, which consists in forming a saturated solution of the nitrate in a liquid solvent incapable of dissolving the said agent, forming a saturated solution of the sensitizing agent in a liquid solvent incapable of dissolving the said nitrate, and mixing said solutions together.

14. The method of sensitizing ammonium nitrate, which consists in disseminating through the crystals of said nitrate particles of a sensitizing agent in amount affording an excess of ammonium nitrate over the sensitizing agent in the resulting mixture.

15. The process of sensitizing ammonium nitrate, which comprises simultaneously crystallizing ammonium nitrate and a sensitizing agent in relative quantities affording a preponderance of the ammonium nitrate over the sensitizing agent in the resulting cocrystallized mixture.

16. The method of sensitizing ammonium nitrate, which consists in mixing a solution of said nitrate with a solution of a sensitizing agent, and simultaneously precipitating from solution both the nitrate and the sensitizing agent.

17. The process of sensitizing ammonium nitrate, which comprises mixing a saturated solution of the said nitrate with a saturated solution of a sensitizing agent, and simultaneuosly precipitating the nitrate and the agent.

18. The process of sensitizing ammonium nitrate, which comprises forming a solution containing both the nitrate and the sensitizing agent, and simultaneously separating from solution both the nitrate and the agent.

19. The process of sensitizing ammonium nitrate, which consists in forming a saturated solution of the nitrate in alcohol, forming an aqueous solution of a sensitizing agent insoluble in alcohol, and mixing said solutions to obtain a simultaneous separation therefrom of both the nitrate and the agent.

20. The process of sensitizing ammonium nitrate, which comprises forming a solution of the nitrate and of a sensitizing agent at an elevated temperature, and reducing the temperature of said solution to obtain a simultaneous separation therefrom both of the nitrate and the sensitizing agent.

21. The process of sensitizing ammonium nitrate, which comprises forming a hot aqueous solution of the nitrate, dissolving a sensitizing agent in said hot solution, and reducing the temperature of the solution to cause a simultaneous separation therefrom of the nitrate and the sensitizing agent.

22. The process of sensitizing ammonium nitrate, which comprises forming an aqueous solution of ammonium nitrate, dissolving rosin in alcohol, and mixing together the alcohol solution of the rosin and the aqueous solution of the nitrate.

23. The process of sensitizing ammonium nitrate, which comprises forming a solution containing both the nitrate and the sensitizing agent, and precipitating said nitrate and agent simultaneously from the solution.

24. The process of sensitizing ammonium nitrate, which consists in forming a solution containing both the nitrate and a sensitizing agent, and evaporating said solution to obtain a simultaneous separation therefrom of both the nitrate and the sensitizing agent.

25. The process of sensitizing ammonium nitrate, which consists in forming a mixture of alcohol and water, bringing said mixture into contact with an excess of both ammonium nitrate and a sensitizing agent soluble in the mixture, and effecting a simultaneous separation from the resulting solution of dissolved portions of the nitrate and the sensitizing agent.

26. The process of sensitizing ammonium nitrate, which consists in forming a mixture of alcohol and water, bringing said mixture into contact with an excess both of ammonium nitrate and a sensitizing agent soluble in the mixture, and evaporating the resulting solution to obtain a simultaneous separation of the nitrate and the sensitizing agent.

27. The process of sensitizing ammonium nitrate, which comprises forming a mixture of alcohol in water, bringing said mixture at a temperature of 60° centigrade into contact with an excess both of ammonium nitrate and a sensitizing agent soluble in said mixture, and effecting a simultaneous separation from the resulting solution of both the nitrate and the sensitizing agent.

28. The process of sensitizing ammonium nitrate, which consists in forming a mixture of alcohol and water, bringing said mixture at an elevated temperature into contact with an excess both of ammonium nitrate and a sensitizing agent soluble in the mixture, and reducing the temperature of the resulting solution to effect simultaneous separation therefrom of both the nitrate and the sensitizing agent.

29. The process of sensitizing ammonium nitrate, which comprises emulsifying a sensitizing agent in a solution of ammonium nitrate, and effecting a separation of nitrate from the mixture.

30. The process of sensitizing ammonium nitrate, which comprises emulsifying a sensitizing agent in a concentrated solution of ammonium nitrate, and effecting a separation of the nitrate from the solution.

31. The process of sensitizing ammonium nitrate, which comprises emulsifying a nitrated organic substance in a solution of ammonium nitrate, and effecting separation of nitrate from the solution.

32. The process of sensitizing ammonium nitrate, which comprises emulsifying trinitrotoluene in a solution of ammonium nitrate, and effecting a separation of nitrate from the solution.

33. The process of sensitizing ammonium nitrate, which consists in forming a saturated solution of ammonium nitrate in water, adding to this solution an excess of a sensitizing agent soluble in the ammonium nitrate solution, agitating the mixture to obtain an emulsification of the sensitizing agent, adding the emulsion to approximately five times its weight of a saturated aqueous ammounium nitrate solution, and effecting a separation from the solution of the ammonium nitrate.

34. The process of sensitizing ammonium nitrate, which comprises emulsifying a sensitizing agent in a solution of ammonium nitrate, adding said emulsion to a saturated aqueous solution of ammonium nitrate, and effecting a separation from the solution of the ammonium nitrate.

35. The process of sensitizing ammonium nitrate, which comprises emulsifying a sensitizing agent in a solution of a nitrate at an elevated temperature, adding the warm emulsion to a saturated aqueous solution of ammonium nitrate at an elevated temperature, and cooling the solution to obtain a separation therefrom of the crystals of ammonium nitrate.

36. The process of sensitizing ammonium nitrate, which comprises separating the nitrate from a solution in the presence of an emulsion of a sensitizing agent.

37. The process of sensitizing ammonium nitrate, which comprises forming a solution of the nitrate in an emulsion of a sensitizing agent, and effecting a separation of the nitrate from the solution.

38. The process of sensitizing ammonium nitrate, which comprises forming a solution of the nitrate in an emulsion of a sensitizing agent at an elevated temperature, and reducing the temperature of the solution to obtain a separation of the nitrate therefrom.

WALTER O. SNELLING.